United States Patent
Jeong et al.

(10) Patent No.: US 12,066,048 B2
(45) Date of Patent: Aug. 20, 2024

(54) BATTERY MODULE STRUCTURED SO AS TO PREVENT ENTRY OF FOREIGN SUBSTANCES, AND BATTERY PACK AND MOTOR VEHICLE COMPRISING SAME

(71) Applicant: LG Chem, Ltd., Seoul (KR)

(72) Inventors: Jong-Ha Jeong, Daejeon (KR); Young-Ho Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 403 days.

(21) Appl. No.: 17/044,629

(22) PCT Filed: Dec. 18, 2019

(86) PCT No.: PCT/KR2019/017949
§ 371 (c)(1),
(2) Date: Oct. 1, 2020

(87) PCT Pub. No.: WO2020/138821
PCT Pub. Date: Jul. 2, 2020

(65) Prior Publication Data
US 2021/0164511 A1  Jun. 3, 2021

(30) Foreign Application Priority Data
Dec. 26, 2018  (KR) .................. 10-2018-0169968

(51) Int. Cl.
*H01M 50/552* (2021.01)
*F16B 33/00* (2006.01)
(Continued)

(52) U.S. Cl.
CPC ......... *F16B 33/004* (2013.01); *H01M 50/105* (2021.01); *H01M 50/178* (2021.01);
(Continued)

(58) Field of Classification Search
CPC ............. H01M 50/204; H01M 50/507; H01M 50/531; H01M 50/543; H01M 50/289;
(Continued)

(56) References Cited

U.S. PATENT DOCUMENTS

2010/0081048 A1  4/2010  Nansaka et al.
2011/0059342 A1  3/2011  Lee et al.
(Continued)

FOREIGN PATENT DOCUMENTS

CN   102379058 A   3/2012
CN   102057520 B   8/2013
(Continued)

OTHER PUBLICATIONS

Machine translation of JP-2005353547-A (Year: 2005).*
(Continued)

*Primary Examiner* — Cynthia K Walls
(74) *Attorney, Agent, or Firm* — Lerner David LLP

(57) ABSTRACT

A battery module includes a cell stack formed by stacking a plurality of battery cells; a bus bar frame assembly having a bus bar frame configured to cover the longitudinal sides of the cell stack and a plurality of bus bars fixed on the bus bar frame and electrically connected to the battery cells; a module terminal having a lead connection fixed on the bus bar frame and electrically connected to the battery cells and a head connected to the lead connection to extend above the lead connection; a terminal nut located below the head; and a frame cover having a nut accommodation portion configured to accommodate the terminal nut and a bolt accommodation portion to accommodate a bolt passing through the head and the terminal nut, the frame cover being configured to cover the bus bar frame assembly so that the head is exposed to an outside.

12 Claims, 9 Drawing Sheets

(51) Int. Cl.
  *H01M 50/105* (2021.01)
  *H01M 50/178* (2021.01)
  *H01M 50/204* (2021.01)
  *H01M 50/211* (2021.01)
  *H01M 50/296* (2021.01)
  *H01M 50/50* (2021.01)
  *H01M 50/507* (2021.01)
  *H01M 50/531* (2021.01)
  *H01M 50/548* (2021.01)
  *H01M 50/284* (2021.01)
  *H01M 50/289* (2021.01)

(52) U.S. Cl.
  CPC ....... *H01M 50/204* (2021.01); *H01M 50/211* (2021.01); *H01M 50/296* (2021.01); *H01M 50/50* (2021.01); *H01M 50/507* (2021.01); *H01M 50/531* (2021.01); *H01M 50/548* (2021.01); *H01M 50/284* (2021.01); *H01M 50/289* (2021.01); *H01M 2220/20* (2013.01)

(58) Field of Classification Search
  CPC ............. H01M 50/105; H01M 50/178; H01M 50/211; H01M 50/296; H01M 50/502; H01M 50/517
  See application file for complete search history.

(56) References Cited

U.S. PATENT DOCUMENTS

| | | | |
|---|---|---|---|
| 2011/0092111 A1 | 4/2011 | Tsuchiya et al. | |
| 2012/0040234 A1* | 2/2012 | Amagai | H01M 50/572 |
| | | | 429/153 |
| 2013/0052495 A1 | 2/2013 | Umetani et al. | |
| 2016/0336577 A1* | 11/2016 | Eom | H01M 50/105 |
| 2017/0125774 A1 | 5/2017 | Choi et al. | |
| 2018/0194235 A1 | 7/2018 | Kim et al. | |
| 2019/0001838 A1 | 1/2019 | Choi et al. | |
| 2020/0014005 A1* | 1/2020 | Lee | H01M 50/519 |

FOREIGN PATENT DOCUMENTS

| | | | | |
|---|---|---|---|---|
| CN | 207183361 U | 4/2018 | | |
| EP | 2355206 A1 | 8/2011 | | |
| JP | 2005347043 A | 12/2005 | | |
| JP | 2005353547 A | * 12/2005 | ............. | B60L 11/18 |
| KR | 20110008323 A | 1/2011 | | |
| KR | 101023921 B1 | 3/2011 | | |
| KR | 20120117521 A | 10/2012 | | |
| KR | 20160144764 A | 12/2016 | | |
| KR | 20170071795 A | 6/2017 | | |
| KR | 101821378 B1 | 1/2018 | | |
| KR | 20180038253 A | 4/2018 | | |
| KR | 20180099437 A | 9/2018 | | |

OTHER PUBLICATIONS

Extended European Search Report for Application No. EP 19905659, dated Jun. 21, 2021, 5 pages.

Search report from International Appliction No. PCT/KR2019/017949, mailed Apr. 1, 2019.

Search Report dated May 25, 2022 from the Office Action for Chinese Application No. 201980026305.0, 3 pages.

* cited by examiner

BATTERY MODULE STRUCTURED SO AS TO PREVENT ENTRY OF FOREIGN SUBSTANCES, AND BATTERY PACK AND MOTOR VEHICLE COMPRISING SAME

CROSS-REFERENCE TO RELATED APPLICATIONS

The present application is a national phase entry under 35 U.S.C. § 371 of International Application No. PCT/KR2019/017949, filed Dec. 18, 2019, which claims priority to Korean Patent Application No. 10-2018-0169968 filed on Dec. 26, 2018 in the Republic of Korea, the disclosures of which are incorporated herein by reference.

TECHNICAL FIELD

The present disclosure relates to a battery module having a structure for preventing foreign matter from entering, and a battery pack and a vehicle including the battery module. More particularly, the present disclosure relates to a battery module having a structure for reinforcing rigidity of a portion where a nut is fixed, increasing the degree of freedom in selecting a length of a bolt inserted into the nut and also preventing foreign matter from entering the battery module, when applying a bolt/nut fastening structure to fasten a terminal of an electronic device or another battery module to a terminal of the battery module, and a battery pack and a vehicle including the battery module.

BACKGROUND ART

In order to supply electric energy to an application such as an electric vehicle using a battery module or a battery pack in which a plurality of battery modules are connected, a terminal or a connecting bar of a power cable must be fastened to a module terminal of the battery module.

When an external terminal such as a terminal or a connecting bar of a power cable is fastened to the module terminal of the battery module as described above, a bolt/nut fixing structure may be applied. In the bolt/nut fixing structure, a terminal nut is located at a lower part of the module terminal of the battery module, and an external terminal is located at an upper part of the module terminal. Then, if the external nut is inserted into a bolt and then rotated in a clockwise direction, the terminal nut is closely adhered to a lower surface of the module terminal, and also the external terminal is adhered and fixed on the module terminal.

For example, in the battery module applied to an electric vehicle, if the coupling force between the external terminal and the module terminal is weakened to cause a contact failure between the external terminal and the module terminal, components of the electric vehicle cannot be normally performed partly or entirely. Thus, the bolt must be tightened with very strong force.

In this case, the structure surrounding the periphery of the nut is usually made of a resin injection material for insulation so that the nut does not turn together when the bolt is rotated for fastening.

In addition, in the bolt/nut fixing structure, in order to obtain a high fastening force, the bolt must be sufficiently rotated in a state of being fastened to the nut. However, if a nut having a blocked lower surface is applied or the injection material accommodating the nut has a blocked structure at the surface supporting the nut, the bolt may not be sufficiently rotated, and accordingly the coupling force between the module terminal and the external terminal may not be sufficiently secured.

DISCLOSURE

Technical Problem

The present disclosure is designed to solve the problems of the related art, and therefore the present disclosure is directed to providing a battery module, which has a structure in which a nut is stably fixed even though a bolt is strongly fastened, by reinforcing rigidity of a portion where the nut is fixed.

In addition, the present disclosure is also directed to providing a battery module, which has an additional space for accommodating the bolt so that the bolt may be sufficiently rotated, and also has a structure capable of preventing foreign matter, which may be generated by friction between the bolt and the nut as the bolt is rotated with strong force, from entering the inner space of the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; a bus bar frame assembly having a bus bar frame configured to cover a first longitudinal side and a second longitudinal side of the cell stack and a plurality of bus bars fixed on the bus bar frame and electrically connected to the battery cells; a module terminal having a lead connection portion fixed on the bus bar frame and electrically connected to the battery cells and a head portion connected to the lead connection portion to extend above the lead connection portion; a terminal nut located below the head portion; and a frame cover having a nut accommodation portion configured to accommodate the terminal nut and a bolt accommodation portion formed below the nut accommodation portion to accommodate a bolt passing through the head portion and the terminal nut, the frame cover being configured to cover the bus bar frame assembly so that the head portion is exposed to the outside.

The terminal nut may be a hexagonal nut.

The nut accommodation portion may have a size corresponding to the terminal nut, and an inner wall of the nut accommodation portion may be in contact with a side surface of the terminal nut so that the terminal nut does not rotate together when the bolt rotates.

The bolt accommodation portion may be shaped as a groove and may be formed at a bottom surface of the nut accommodation portion.

The frame cover may include a barrier formed between the bolt accommodation portion and the bus bar frame assembly to prevent foreign matter generated when the bolt and the terminal nut are fastened from entering the bus bar frame assembly.

The battery module may further comprise an end plate configured to cover the frame cover.

The battery module may further comprise a reinforcing frame interposed between the end plate and the frame cover at a location corresponding to the nut accommodation portion.

The battery cell may include an electrode assembly; a pair of electrode leads connected to the electrode assembly to extend in opposite directions along a longitudinal direction of the battery cell; and a cell case configured to accommodate the electrode assembly and sealed so that the electrode lead is exposed to the outside.

The pair of electrode leads may be formed at locations and biased downward from a center of the cell stack in a height direction thereof.

The module terminal may be disposed in a space formed above the electrode lead due to the biasing of the pair of electrode leads.

In another aspect of the present disclosure, there are also provided a battery pack and a vehicle, which comprises the battery module according to an embodiment of the present disclosure.

Advantageous Effects

According to an embodiment of the present disclosure, even if the bolt is tightened with a strong force to fasten an external terminal to the module terminal, the nut may be stably fixed.

In addition, according to another embodiment of the present disclosure, since an additional space for accommodating the bolt protruding below the nut is provided, the bolt may be sufficiently rotated. Also, it is possible to prevent foreign matter, which may be generated by friction between the bolt and the nut as the bolt is rotated with a strong force, from entering the inner space of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 8:
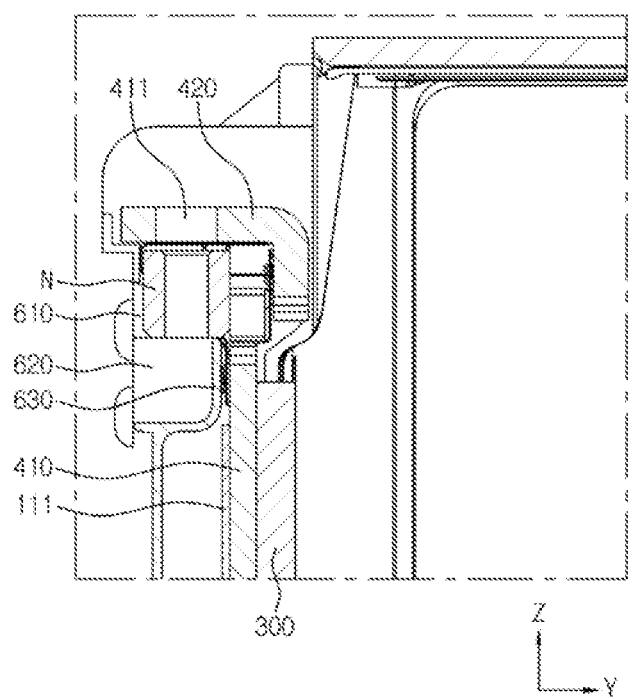
FIG. 8 is a cross-sectioned view, taken along the line X-X' of FIG. 2.

Referring to FIGS. 1 to 4, a battery module according to an embodiment of the present disclosure may include a cell stack 100, a FPCB assembly 200, a bus bar frame assembly 300 (see FIG. 8), a module terminal 400, an upper cover 450, a mono frame 500, a frame cover 600 and an end plate 700.

Figure 4:
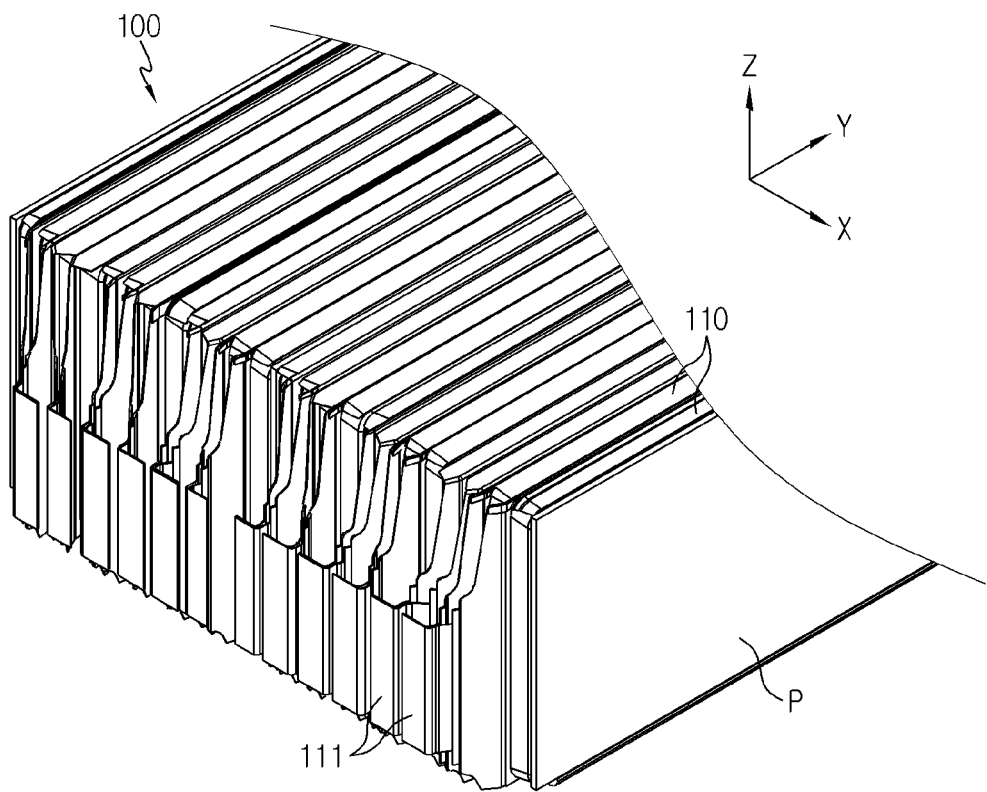
FIG. 4 is a perspective view showing a cell stack applied to the battery module according to an embodiment of the present disclosure.

As shown in FIG. 4, the cell stack 100 includes a plurality of battery cells 110 stacked to face each other at wide surfaces thereof. The cell stack 100 may include at least one buffer pad P interposed at an outermost battery cell 110 and/or between adjacent battery cells 110.

That is, the cell stack 100 may be inserted into the mono frame 500 in a state of being coupled with the bus bar frame assembly 300, the module terminal 400 and the upper cover 450. At this time, in order to insert the cell stack 100 easily while securing a maximum volume of the cell stack 100, the buffer pad P made of an elastic material such as a sponge may be additionally applied.

Figure 5:
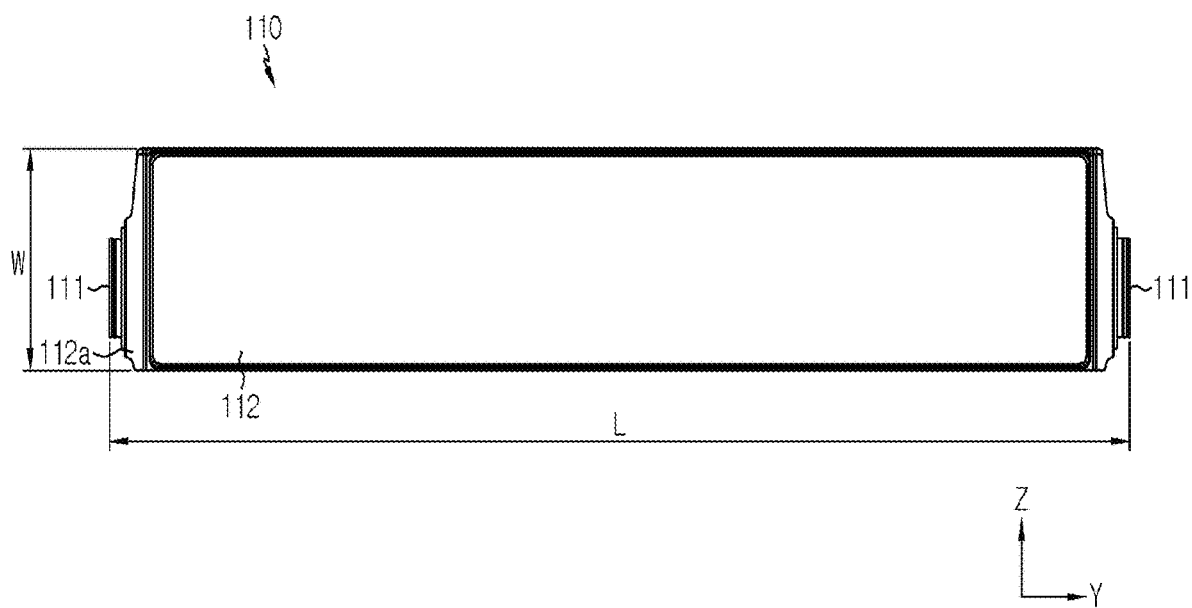
FIG. 5 is a plan view showing a battery cell applied to the battery module according to an embodiment of the present disclosure.

Referring to FIG. 5, a specific structure of the battery cell 110 is illustrated. A pouch-type battery cell may be applied as the battery cell 110. The pouch-type battery cell 110 includes an electrode assembly (not shown), a pair of electrode leads 111 and a cell case 112.

Although not shown in the drawings, the electrode assembly has a form in which separators are interposed between positive electrode plates and negative electrode plates that are repeatedly stacked alternately, and separators are preferably positioned at both outermost sides for insulation.

The positive electrode plate includes a positive electrode current collector and a positive electrode active material layer coated on one side of the positive electrode current collector, and a positive electrode uncoated region not coated with a positive electrode active material is formed at one side end of the positive electrode plate. The positive electrode uncoated region functions as a positive electrode tab.

The negative electrode plate may include a negative electrode current collector and a negative electrode active material layer coated on one surface or both sides of the negative electrode current collector, and a negative electrode uncoated region not coated with a negative electrode active material is formed at one side end of the negative electrode plate. The negative electrode uncoated region functions as a negative electrode tab.

In addition, the separator is interposed between the positive electrode plate and the negative electrode plate to prevent electrode plates having different polarities from directly contacting each other. The separator may made of a porous material so that ions may be moved using the electrolyte as a medium between the positive electrode plate and the negative electrode plate.

The pair of electrode leads 111 are connected to the positive electrode tab (not shown) and the negative electrode tab (not shown), respectively, and are drawn out of the cell case 112. The pair of electrode leads 111 are drawn out at one longitudinal side and the other longitudinal side of the battery cell 110, respectively. That is, the battery cell 110 applied to the present disclosure corresponds to a bidirectional draw-out battery cell in which the positive electrode lead and the negative electrode lead are drawn in opposite directions. In addition, the pair of electrode leads 111 are positioned to be biased to one side from a center of the battery cell 110 in a width direction (the Z-axis direction of FIG. 5). Specifically, the pair of electrode leads 111 are positioned to be biased to one side from the center of the battery cell 110 in the width direction, preferably to be biased downward along the height direction (the Z-axis direction of FIG. 4) of the cell stack 100.

If the pair of electrode leads 111 are positioned to be biased to one side from the center of the battery cell 110 in the width direction as described above, it is possible to give a space for installation of the module terminal 400, explained later, so that the energy density of the battery module is improved. The increase in energy density due to the structure in which the electrode lead 111 is installed to be biased will be described in detail later. The cell case 112 includes two regions, namely an accommodation portion accommodating the electrode assembly and a sealing portion extending in a circumferential direction of the accommodation portion and thermally fused in a state where the electrode lead 111 is drawn out to seal the cell case 112.

Although not shown in the figures, the cell case 112 is sealed by affixing and thermally fusing edge portions of an upper case and a lower case made of a multi-layered pouch film in which a resin layer, a metal layer and a resin layer are stacked in order.

In the sealing portion, a terrace portion 112a corresponding to a region located in the direction in which the electrode lead 111 is drawn out has a tapered shape such that both sides of the terrace portion 112a are cut so that the width thereof is gradually reduced along the drawing direction of the electrode lead 111. As described above, if the width of the terrace portion 112a is gradually reduced toward the outer direction of the battery cell 110, the electrode lead 111 may be disposed to be biased, and the energy density of the battery module may be improved.

Meanwhile, the battery cell 110 applied to the present disclosure is a long cell where a ratio of width (W) to length (L) is about 3 or more and 12 or less. In the battery module according to the present disclosure, if the long cell type battery cell 110 is employed, it is possible to improve the capacity of the battery while minimizing the increase in the height of the battery module, which makes it easy to install the battery module at a lower part of a seat or a trunk of a vehicle.

Figure 3:
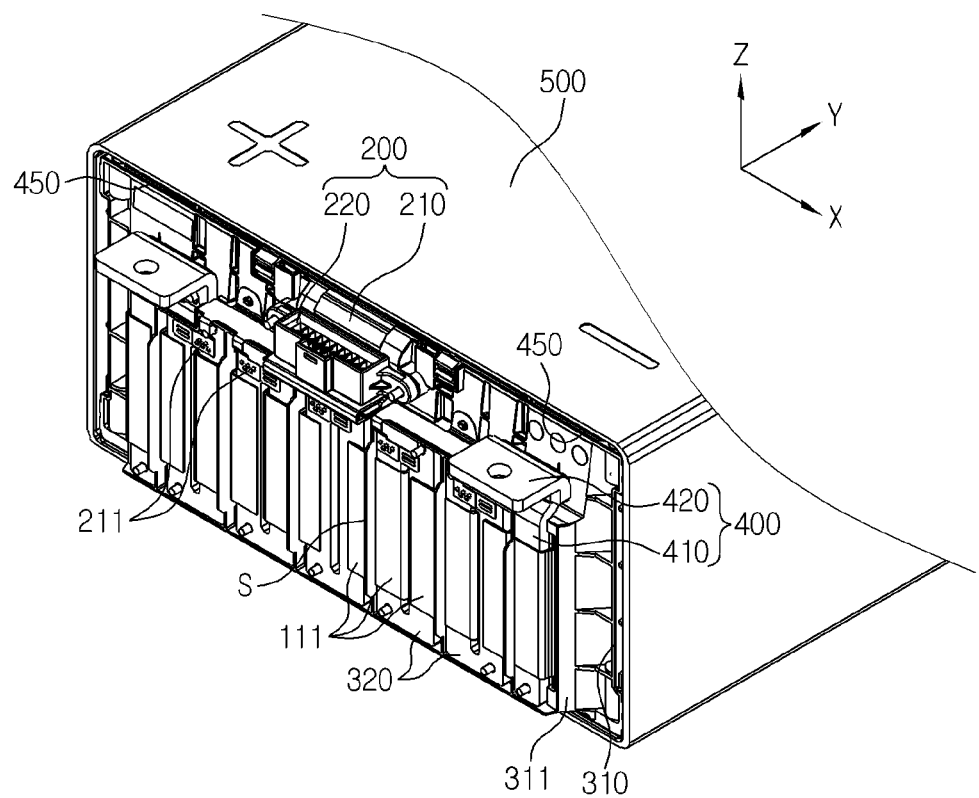
FIG. 3 is a perspective view showing a state in which an end plate and a frame cover are removed from the battery module according to an embodiment of the present disclosure.

Referring to FIG. 3, the FPCB assembly 200 may be implemented to include a flexible printed circuit board (FPCB) 210 and a connector 220.

The FPCB 210 extends along the longitudinal direction of the battery module (the Y-axis direction of FIG. 3) to cover at least a portion of the top surface of the cell stack 100, and both ends of the FPCB 210 are bent and placed on the bus bar frame assembly 300. Connection terminals 211 are provided at both ends of the bent FPCB 210, and the connection terminals 211 are connected to the bus bar 320 and the module terminal 400 to electrically connect the FPCB 210 to the battery cell 110.

The connector 220 is exposed out of the upper cover 450 and the mono frame 500 and mounted on the FPCB 210 that is bent toward the bus bar frame assembly 300. The connector 220 is disposed in a space formed above the electrode lead 111 due to the biasing of the electrode lead 111, similar to the installation position of the module terminal 400 described above. The arrangement position of the connector 220 minimizes the increase in the volume of the battery module due to the installation of the connector 220, thereby increasing the energy density of the battery module.

The connector 220 is electrically connected to the battery cells 110 through the FPCB 210. In addition, a control device (not shown) such as a BMS is connected to the connector 220, and the control device receives information about the voltage of the battery cell 110 and controls charging and discharging of the battery module with reference to the information.

Referring to FIG. 3, the bus bar frame assembly 300 may be implemented to include a bus bar frame 310 configured to cover one longitudinal side and the other longitudinal side of the cell stack 100 and a plurality of bus bars 320 fixed on the bus bar frame 310 and electrically connected to the battery cell 110.

The bus bar frame 310, for example, may be made of an insulating material such as resin, and includes a bus bar placing portion 311 formed to protrude at a position corresponding to electrode leads 111 of the battery cell 110. The bus bar placing portion 311 is formed at a position biased downward from the center of the cell stack 100 in the height direction (the Z-axis direction of FIGS. 3 and 4), like the electrode lead 111. The biasing of the bus bar placing portion 311 is to secure a space for installing components such as the connector 220 or the module terminal 400, similar to the biasing of the electrode lead 111.

The bus bar placing portion 311 has a plurality of lead slits S formed at positions corresponding to the electrode leads 111. Through the lead slits S, the electrode leads 111 are drawn out of the bus bar frame assembly 300, and the drawn electrode leads 111 are bent and fixed by welding or the like on the bus bar 320.

Referring to FIG. 3, the module terminal 400 is provided in a pair, and each module terminal 400 includes a lead connection portion 410 and a head portion 420.

Figure 7:
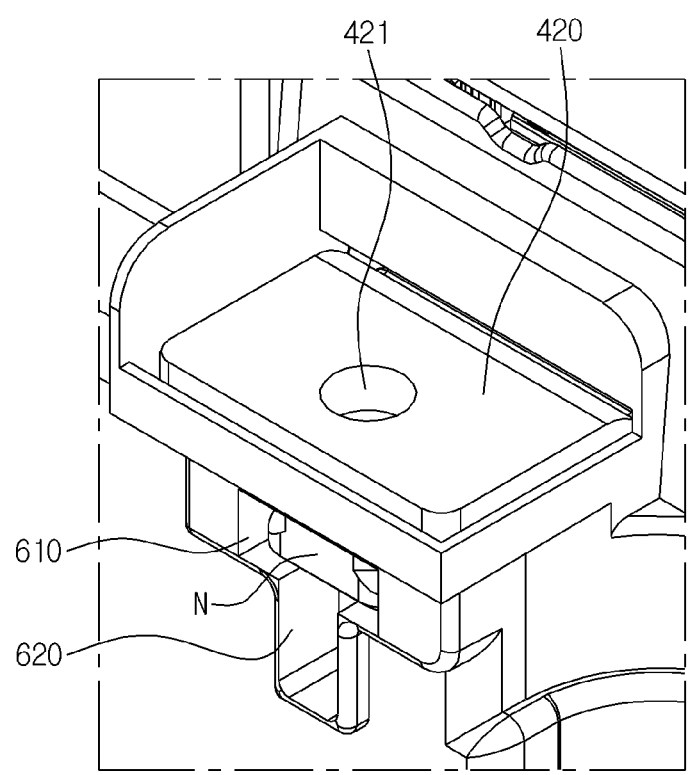
FIG. 7 is a partially enlarged view showing a region in which a module terminal is located, in the battery module depicted in FIG. 2.

The lead connection portion 410 is fixed on the bus bar placing portion 311 of the bus bar frame 310 and is connected to the electrode lead 111 located at both outermost sides along the width direction of the cell stack 100 (the X-axis direction of FIGS. 3 and 4). The head portion 420 is connected to the lead connection portion 410 and extends above the lead connection portion 410. The head portion 420 has a terminal hole 421 (see FIG. 7) into which a bolt B is inserted for fastening an external terminal (not shown) to the module terminal 400.

Figure 6:
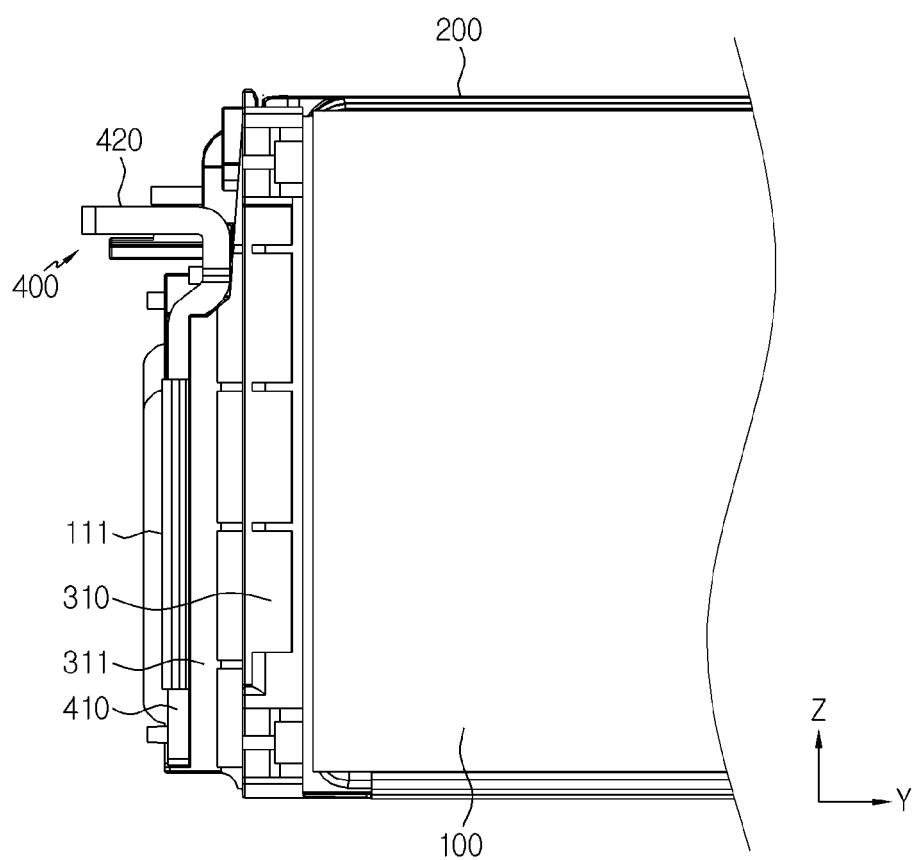
FIG. 6 is a side view showing a state in which a mono frame, an upper cover, an end plate and a frame cover are removed from the battery module according to an embodiment of the present disclosure.

Referring to FIG. 6 along with FIG. 3, the head portion 420 of the module terminal 400 is located in the space formed above the electrode lead 111 and the bus bar placing portion 311 due to the biasing of the electrode lead 111 (upward along the Z axis based on FIGS. 3 and 5). The formation position of the head portion 420 is to minimize the volume of the battery module increased due to the installation of the module terminal 400 by utilizing the space formed by the biased installation of the electrode lead 111.

Referring to FIGS. 3 and 4 together, the upper cover 450 corresponds to a part that covers the top surface of the cell stack 100 (a surface parallel to the X-Y plane of FIG. 4). The upper cover 450 is hinged with a pair of bus bar frames 310, respectively. Thus, the pair of the bus bar frames 310 may be rotated relative to the upper cover 450, based on the hinged portion.

Figure 2:
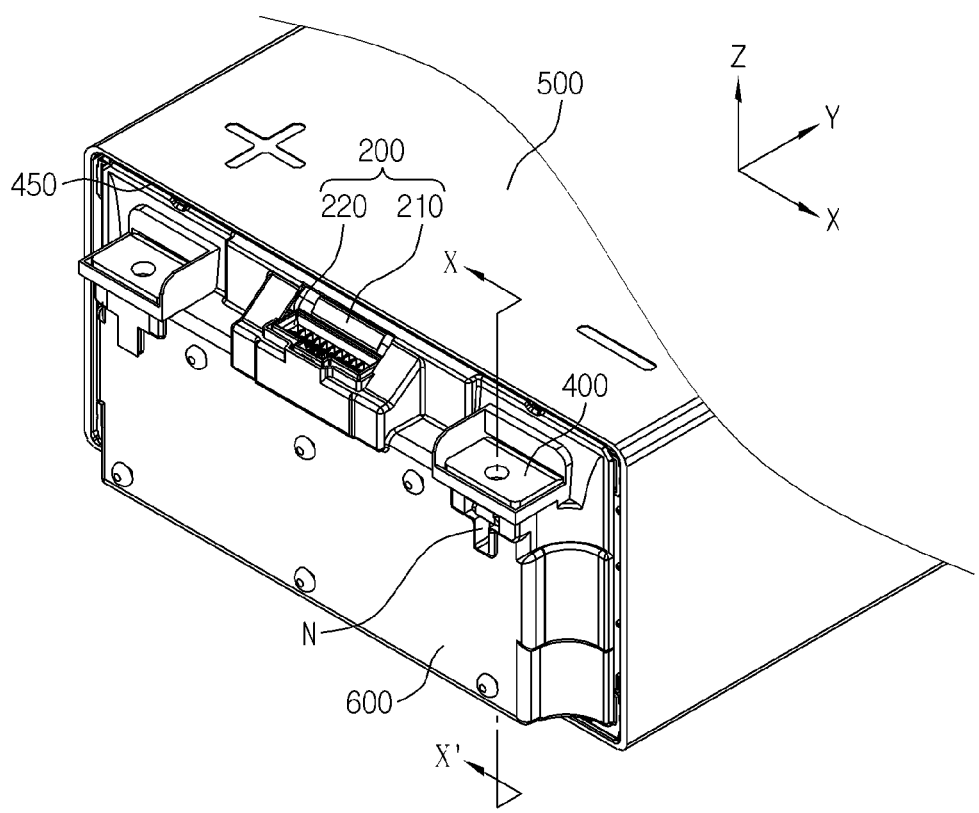
FIG. 2 is a perspective view showing a state in which an end plate is removed from the battery module according to an embodiment of the present disclosure.

Referring to FIGS. 7 to 10 along with FIG. 2, the frame cover 600 covers the bus bar frame assembly 300 so that the head portion 420 of the module terminal 400 is exposed to the outside. The frame cover 600 includes a nut accommodation portion 610, a bolt accommodation portion 620, and a barrier 630.

The nut accommodation portion 610 accommodates a terminal nut N located below the head portion 420 of the module terminal 400. In order to supply electric energy to an application such as an electric vehicle by using the battery module or a battery pack in which a plurality of battery modules are connected, an external terminal T such as a terminal or a connecting bar of a power cable provided in the vehicle must be fastened to the module terminal 400 of the battery module (see FIG. 10). As described above, in order to fasten the external terminal T to the module terminal 400 of the battery module, the battery module according to an embodiment of the present disclosure uses a bolt/nut fixing structure.

That is, the terminal nut N is located under the head portion 420 of the module terminal 400, the external terminal T is located above the head portion 420, and then a bolt B (see FIG. 10) is inserted to pass through the external terminal T and the head portion 420 in order and is rotated clockwise. In this case, the bolt B moves downward along a thread formed on the terminal nut N, and the terminal nut N moves upward (in a direction shown by the arrows in FIG. 10). Accordingly, the external terminal T is fixed between the bolt B and the head portion 420. As the bolt B is rotated clockwise more, the fixing force becomes stronger.

In this way, in order for the terminal nut N to move upward with the rotation of the bolt B, the terminal nut N must be fixed without rotating together according to the rotation of the bolt B. That is, an inner wall of the nut accommodation portion 610 is in contact with a side surface of the terminal nut N to fix the terminal nut N so that the terminal nut N does not rotate according to the rotation of the bolt B.

To this end, the nut accommodation portion 610 has a size corresponding to the terminal nut N. Specifically, the nut accommodation portion 610 and the terminal nut N may be formed to have the same width (D1) and the same vertical width (D2), and the terminal nut N may be a hexagonal nut whose cross section is approximately hexagonal.

When the bolt B passes through the terminal nut N to protrude downward below the terminal nut N according to the clockwise rotation of the bolt B, the bolt accommodation portion 620 accommodates the protruding portion of the bolt B. The bolt accommodation portion 620 has a groove shape formed at the bottom surface of the nut accommodation portion 610.

The barrier 630 is formed between the bolt accommodation portion 620 and the bus bar frame assembly 300 to form an inner wall of the bolt accommodation portion 620. The barrier 630 prevents the bolt accommodation portion 620 and the bus bar frame assembly 300 from communicating with each other, thereby preventing foreign matter, such as metal powder generated when the bolt B and the terminal nut N are fastened, from entering the bus bar frame assembly 300.

By preventing foreign matter such as metal powder from entering the bus bar frame assembly 300 as above, it is possible prevent that an unnecessary electrical connection occurs between the electrode leads 111 due to foreign matter to cause a problem such as a short.

Figure 1:
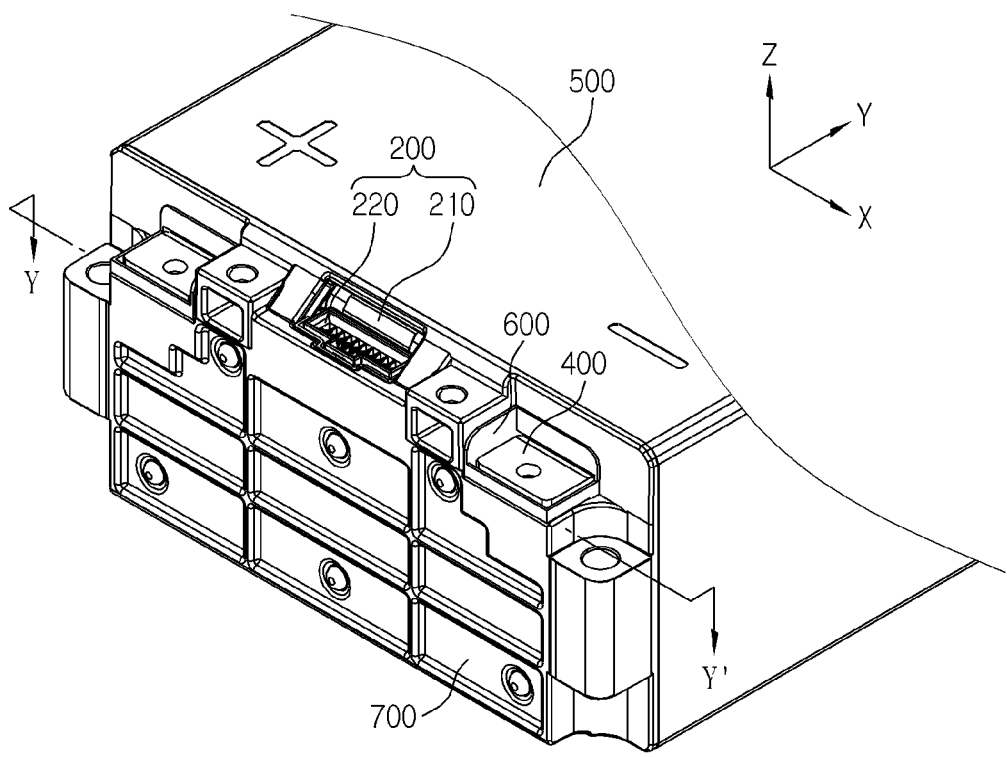
FIG. 1 is a perspective view showing a battery module according to an embodiment of the present disclosure.
Figure 9:
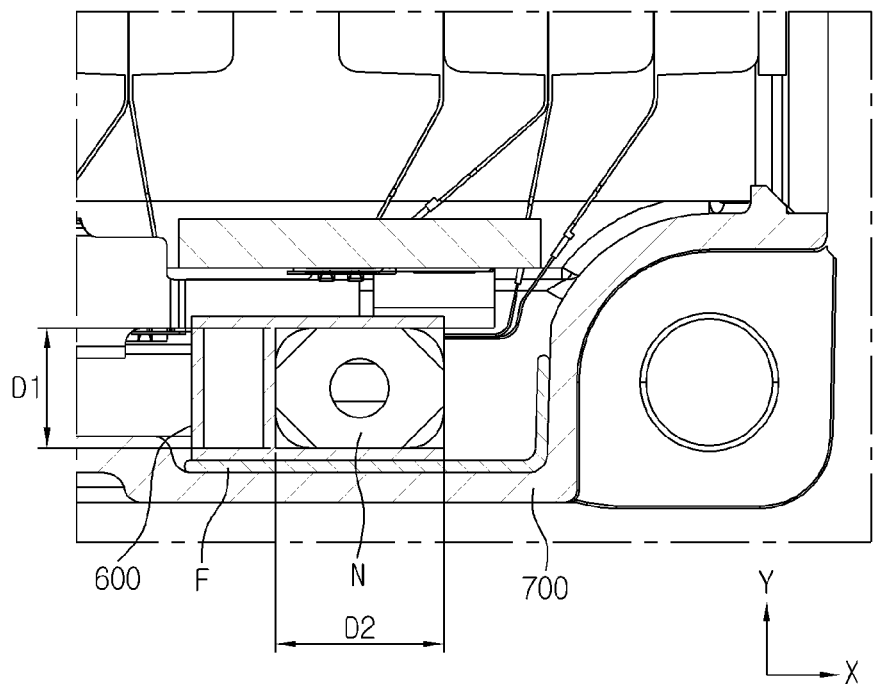
FIG. 9 is a cross-sectioned view, taken along the line Y-Y' of FIG. 1.

Referring to FIGS. 1 and 9 together, the end plate 700 covers the frame cover 600 such that the head portion 420 of the module terminal 400 is exposed to the outside. Meanwhile, as shown in FIG. 9, the battery module according to an embodiment of the present disclosure may further include a reinforcing frame F interposed between the frame cover 600 and the end plate 700.

Figure 10:
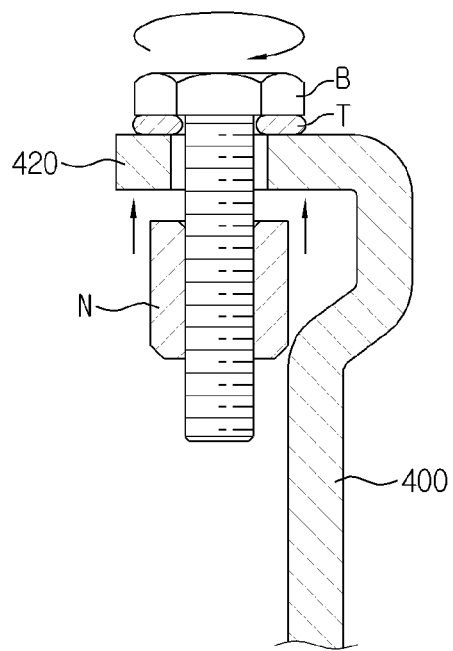
FIG. 10 is a diagram for illustrating a principle that a nut applied to the battery module according to an embodiment of the present disclosure moves according to the rotation of the bolt.

Referring to FIG. 10 along with FIG. 9, the reinforcing frame F is interposed at a position corresponding to the nut accommodation portion 610 of the frame cover 600 to enhance the fixing force of the nut N. That is, the frame cover 600 may be made of a resin material for insulation. In this case, if the bolt B is strongly rotated and tightened, the inner wall of the nut accommodation portion 610 may be bent or damaged not to fix the terminal nut N.

In order to prevent this situation from occurring, the reinforcing frame F may be made of a metal material with a higher rigidity than resin, and the bolt B may be strongly tightened by applying the reinforcing frame F to strengthen the fastening force between the external terminal T and the head portion 420.

As described above, since the head portion 420 of the module terminal 400 is disposed using the space formed by the biasing of the electrode lead 111, the battery module according to an embodiment of the present disclosure may minimize the increase in the volume of the battery module due to the installation of the module terminal 400, thereby improving the energy density.

In addition, the battery module according to an embodiment of the present disclosure includes the bolt accommodation portion 620 accommodating the bolt B protruding below the terminal nut N, thereby increasing the degree of freedom in selecting the length of the bolt B. Accordingly, by using the bolt B having a sufficiently long length to pass through the terminal nut N, the fastening force between the external terminal T and the head portion 420 of the module terminal 400 may be further strengthened.

In addition, the battery module according to an embodiment of the present disclosure includes the barrier interposed between the bolt accommodation portion 620 and the bus bar frame assembly 300 so that the bolt accommodation portion 620 and the bus bar frame assembly 300 cannot communicate with each other. By doing so, it is possible to prevent foreign matter such as metal powder from entering the bus bar frame assembly 300 and causing an event such as a short.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a cell stack formed by stacking a plurality of battery cells;
   a bus bar frame assembly having a bus bar frame configured to cover one longitudinal side and the other longitudinal side of the cell stack and a plurality of bus bars fixed on the bus bar frame and electrically connected to the battery cells;

a module terminal having a lead connection portion and a head portion connected to the lead connection portion, the lead connection portion being fixed on the bus bar frame and electrically connected to the battery cells, the head portion being generally c-shaped such that the head portion first extends from the lead connection portion toward the cell stack, upward, and then away from the cell stack so that a part of the head portion is disposed longitudinally above the lead connection portion;

a terminal nut located vertically below the head portion; and a frame cover having a nut accommodation portion configured to accommodate the terminal nut and a bolt accommodation portion formed vertically below the nut accommodation portion to accommodate a bolt passing through the head portion and the terminal nut in a vertical direction perpendicular to the longitudinal direction, the frame cover being configured to cover the bus bar frame assembly so that the head portion is exposed to the outside.

2. The battery module according to claim 1, wherein the terminal nut is a hexagonal nut.

3. The battery module according to claim 1, wherein the nut accommodation portion has a size corresponding to the terminal nut, and an inner wall of the nut accommodation portion is in contact with a side surface of the bolt to fix the terminal nut so that the terminal nut does not rotate together when the bolt rotates.

4. The battery module according to claim 1, wherein the bolt accommodation portion has a groove shape formed at a bottom surface of the nut accommodation portion.

5. The battery module according to claim 1, wherein the frame cover includes a barrier formed between the bolt accommodation portion and the bus bar frame assembly to prevent foreign matter generated when the bolt and the terminal nut are fastened from entering the bus bar frame assembly.

6. The battery module according to claim 1, further comprising:
an end plate configured to cover the frame cover.

7. The battery module according to claim 6, further comprising:
a reinforcing frame interposed between the end plate and the frame cover at a location corresponding to the nut accommodation portion.

8. The battery module according to claim 1, wherein the battery cell includes:
an electrode assembly;
a pair of electrode leads connected to the electrode assembly to extend in opposite directions along a longitudinal direction of the battery cell; and
a cell case configured to accommodate the electrode assembly and sealed so that the electrode lead is exposed to the outside.

9. The battery module according to claim 8, wherein the pair of electrode leads are formed at locations biased downward from a center of the cell stack in a height direction thereof.

10. The battery module according to claim 9, wherein the module terminal is disposed in a space formed above the electrode lead due to the biasing of the electrode leads.

11. A battery pack, comprising the battery module according to claim 1.

12. A vehicle, comprising the battery module according to claim 1.

* * * * *